United States Patent [19]
Herrmann

[11] Patent Number: 5,103,386
[45] Date of Patent: Apr. 7, 1992

[54] FLYBACK CONVERTER WITH ENERGY FEEDBACK CIRCUIT AND DEMAGNETIZATION CIRCUIT

[75] Inventor: Dieter Herrmann, Büchenbach, Fed. Rep. of Germany

[73] Assignee: U.S. Philips Corporation, New York, N.Y.

[21] Appl. No.: 635,850

[22] Filed: Dec. 28, 1990

[30] Foreign Application Priority Data

Jan. 18, 1990 [DE] Fed. Rep. of Germany ....... 4001324

[51] Int. Cl.$^5$ ............................................ H02M 3/335
[52] U.S. Cl. .......................................... 363/21; 363/56
[58] Field of Search ...................................... 363/21, 56

[56] References Cited

U.S. PATENT DOCUMENTS 4,675,796  6/1987  Gautherin et al. ..................... 363/56

FOREIGN PATENT DOCUMENTS 3634990  6/1987  Fed. Rep. of Germany .
3616160 11/1987  Fed. Rep. of Germany .
103575  6/1984  Japan ..................................... 363/56
69371  4/1986  Japan .

*Primary Examiner*—William H. Beha, Jr.
*Attorney, Agent, or Firm*—Bernard Franzblau

[57] ABSTRACT

A direct-voltage flyback converter includes a primary winding of a transformer in series with the switching path of a controllable switch which is connected in turn to a control device (P). A first capacitor (C1) in series with a first diode (D1) is connected in parallel with the transformer primary winding (N1). A series circuit consisting of a first coil (L1), a second diode (D2) and the first capacitor (C 1) is connected in parallel with the switching path. In order to regulate the output voltage of the switched-mode direct-voltage flyback converter accurately and with low losses, and without the control device being activated from the secondary side, a sensing circuit (M) and a demagnetization circuit (A) are connected to the control device (P). A winding (N3) of the transformer (Tr) is connected in the sensing circuit (M) and a second coil (L2), coupled to the first coil (L1), is connected in the demagnetization circuit (a). The second coil provides demagnetization by transferring energy stored in the first coil into the demagnetization circuit.

13 Claims, 1 Drawing Sheet

FLYBACK CONVERTER WITH ENERGY FEEDBACK CIRCUIT AND DEMAGNETIZATION CIRCUIT

BACKGROUND OF THE INVENTION

This invention relates to a direct-voltage flyback converter having a primary winding in series with the switching path of a controllable switch connected to a control device, a series circuit of a first capacitor and a first diode connected in parallel with the primary winding and a series circuit formed by a first coil, a second diode and the first capacitor being connected in parallel with the switching path.

To supply electronic devices, power supply devices are needed which supply one or several direct voltages. In the case of switched-mode direct-voltage converters, in particular, the basic types of flyback converter and forward converter must be distinguished. In this connection, a direct voltage obtained, for example, from the AC mains voltage by rectification and filtering is converted with the aid of a controllable switch into a rectangular voltage. This is transmitted with the aid of a transformer which, in the case of the flyback converter, also handles the energy storage. This is followed by rectification and filtering. During this process, a current only flows in the secondary circuit during the flyback phase in the case of a flyback converter.

The report "Kompakte Hochfrequenzoszilloskope erfordern eine effektive Stromversorgung" [compact high-frequency oscilloscopes require an effective power supply] in Elektronik Industrie 1, 1986, pages 44 to 48, by J. Vermolen and D. Mellis, describes how the efficiency in a switched-mode direct-voltage converter is improved by adding an unloading network in parallel with the input voltage. In FIG. 5 on page 46, an unloading network is shown in which a capacitor in series with a diode is being connected in parallel with a primary winding, and a coil in series with a further diode and the capacitor are connected in parallel with the switching path of the controllable switch. In this arrangement, the energy contained in the coil is fed back to the input voltage via the diode connected to the primary winding. In FIG. 7 on page 46, it is shown that the on-time of the controllable switch can be controlled in dependence on load fluctuations of the output voltage with the aid of a control device connected to the output voltage. However, such a control device activated from the secondary side is subject to additional power consumption.

SUMMARY OF THE INVENTION

It is an object of the invention to improve a direct-voltage flyback converter of the type initially mentioned. In this connection, it should be possible to control the output voltage of the direct-voltage flyback converter accurately and with low losses without the use of a secondary-side activation of the control device.

In a direct-voltage flyback converter of the type initially mentioned, this object is achieved by the fact that a sensing circuit and a demagnetisation circuit are connected to the control device, a winding of the transformer being connected into the sensing circuit and a second coil coupled to the first coil being connected into the demagnetisation circuit.

In this arrangement, the second coil is used for demagnetisation and transfers a part of the energy stored in the first coil into the demagnetisation network, as a result of which the control device is activated in addition to the activation effected by the sensing circuit and thus the voltage drop of the output voltage, caused in particular by the winding resistance and the diode resistance of the secondary circuit, is compensated.

In an embodiment, the parallel circuit of a first resistor and of a second capacitor in series with a third diode is arranged in parallel with the second coil as the demagnetisation network, a tap of said parallel circuit being connected via a second resistor to the actual-value input of the control device.

The second coil, the third diode and the second capacitor form "parasitic flyback-converter circuit" which has the effect that the second capacitor is charged, as a result of which a voltage builds up across the parallel first resistor. As a result of this, a current flows through the series circuit formed by the first and second resistor, which as a consequence produces at the actual-value input of the control device a voltage which, as compared with a direct-voltage converter without a demagnetisation network, effects a compensation of the fluctuations caused by the secondary-side winding and diode resistance and without the control device being activated from the secondary side. This overall results in saving a potential-bridging control loop which, particularly in the case of direct-voltage converters for low power <5W, for example, for ISDN terminals, would lead to power consumption problems.

Further advantageous embodiments are present in the dependent claims.

BRIEF DESCRIPTION OF THE DRAWING

In the text which follows, the invention will be explained in greater detail with reference to the illustrative embodiments shown in the accompanying drawing, in which.

DESCRIPTION OF THE PREFERRED EMBODIMENTS

Figure 1:
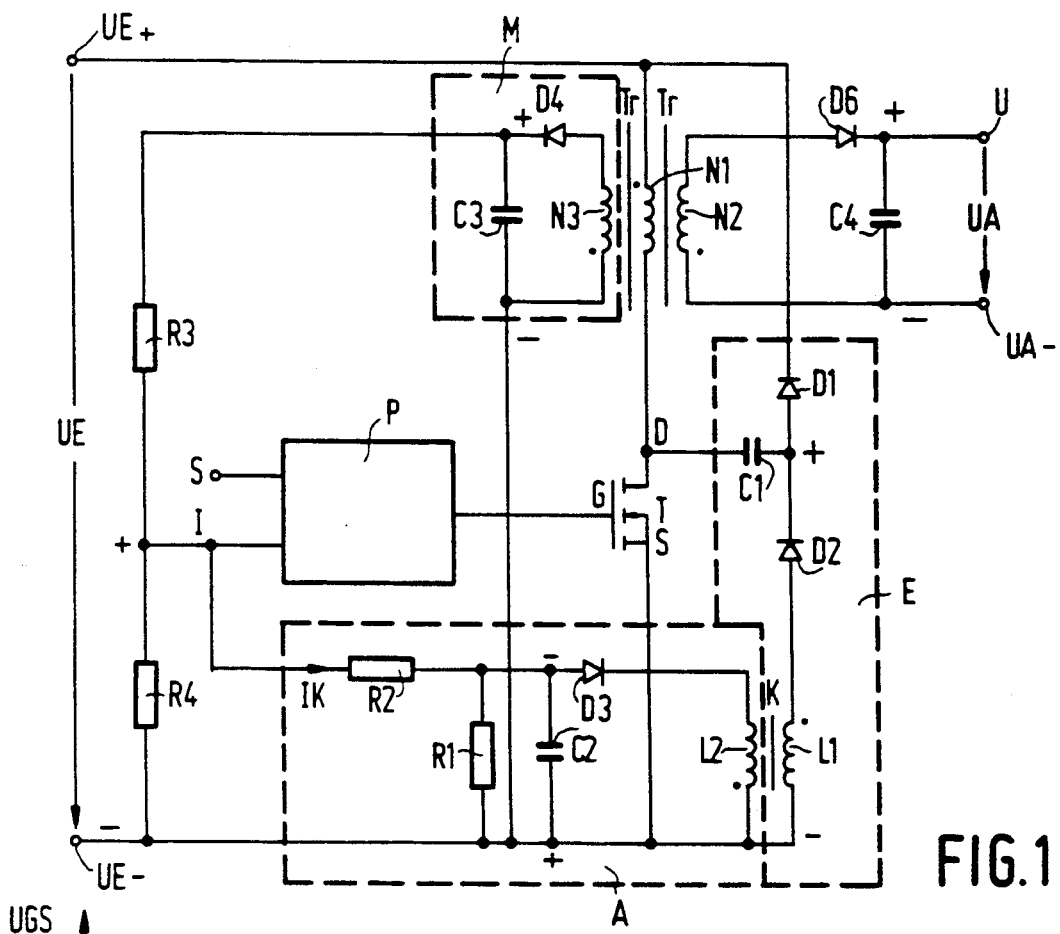
FIG. 1 shows a first illustrative embodiment of a direct-voltage flyback converter.

The direct-voltage flyback converter shown in FIG. 1 has a primary circuit coupled to an input voltage UE present between a positive potential UE+ and a potential UE— which is negative compared with the voltage UE+. In parallel with the input voltage UE. A primary winding N1 of a transformer Tr is connected, in series with the switching path of a controllable switch T, which comprises a self-blocking N-channel MOS field-effect transistor, the source electrode of which is connected to the negative potential UE— of the input voltage UE. The gate electrode of the field-effect transistor T is connected to the output of a control device P constructed as a pulse-width modulator which has at the input side an actual-value input I and a nominal-value input S. The transformer Tr has a further winding N3 of a sensing circuit M. The connecting terminals of the winding N3 are connected to one another via the series circuit of a fourth diode D4 and a third capacitor C3, the common tap being connected via a third resistor R3 to the actual-value input I of the pulse-width modulator P. In addition, the actual-value input I of the pulse-width modulator P is connected via a fourth resistor R4 to the negative potential UE— of the input voltage UE—. In parallel with the input voltage UE, an unloading network E is connected between the positive potential UE+ and the negative potential UE−. For this purpose, the series circuit of a first coil L1, of a second diode D2 and of a first capacitor C1 is arranged in parallel with the switching path of the field-effect transistor T, the common tap of the first capacitor C1 and of the second diode D2 being connected via a first diode D1 to the positive potential UE+ of the input voltage UE. The first coil L1 is coupled via a common core K to a second coil L2 which, on the one hand, is connected to the negative potential UE− and, via the series circuit of a third diode D3 and of a second resistor R2, to the actual-value input I of the pulse-width modulator P. The common tap of the second resistor R2 and the third diode D3 is connected via the parallel circuit of a first resistor R1 and of a second capacitor C2 to the negative potential UE− of the input voltage UE. In the illustrative embodiment shown in FIG. 1, the secondary circuit of the switched-mode direct-voltage flyback converter comprises a secondary winding N2 of the transformer Tr. A sixth diode D6 is arranged in series with the secondary winding N2, a fourth capacitor C4 being located in parallel with the series circuit formed from the secondary winding N2 and the sixth diode D6. An output voltage UA is present at the output terminals UA+ (positive potential UA+) and UA− which is, (negative) coupled across the fourth capacitor C4.

During the conducting phase of the field-effect transistor T, the sixth diode D6 blocks and the input voltage UE is present across the primary winding N1 of the transformer Tr. During the blocking phase of the field-effect transistor T, the sixth diode D6 becomes conductive and the energy absorbed by the transformer Tr during the conducting phase is delivered to the fourth capacitor C4 via the sixth diode D6 and thus the output voltage UA is generated. In this process, the field-effect transistor T is controlled by pulses, the width of which is modulated in dependence on load fluctuations. The pulses are generated by the pulse-width modulator P and applied to the gate of the field-effect transistor T. Via the further winding N3 of the transformer Tr, a voltage is picked up which represents a measure of the output voltage UA. Particularly in the case of load fluctuations, this acts as a control criterion on the actual-value input I of the pulse-width modulator P without, however, including the winding resistance of the secondary winding N2 and the forward voltage of the sixth diode D6 in the control loop. At the nominal-value input S, a predeterminable reference voltage is present.

Figure 2:
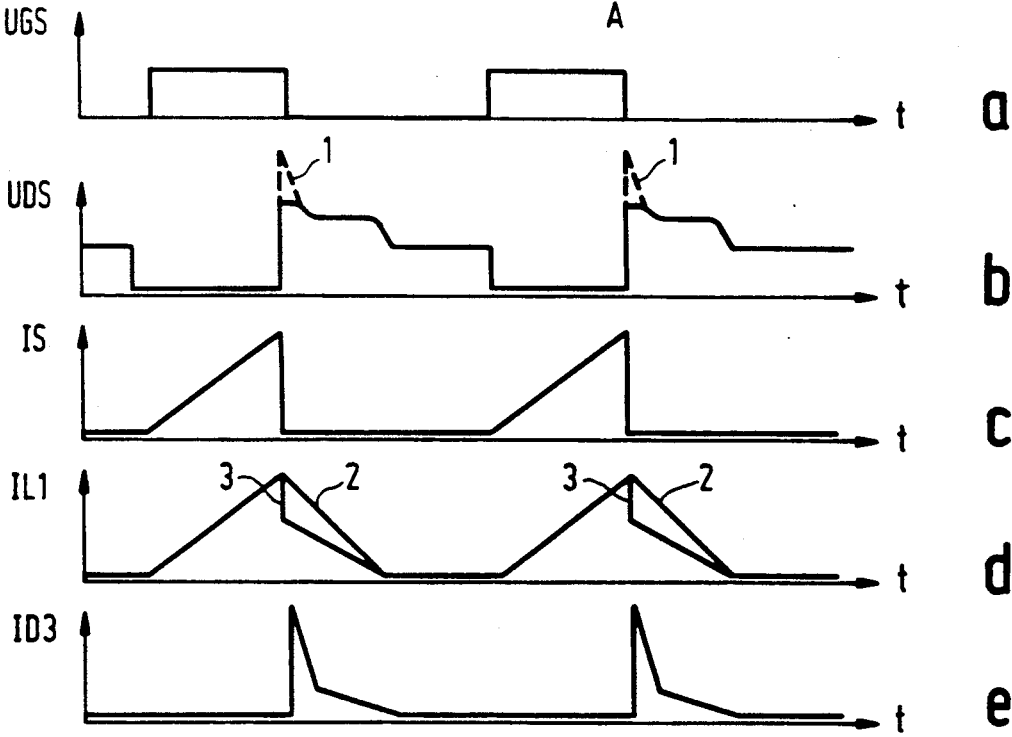
FIG. 2 shows diagrammatic voltage and current characteristics of a direct-voltage flyback converter.

If the field-effect transistor T is cut off, a voltage is present at the drain electrode D of the field-effect transistor T, which voltage is composed of the sum of the input voltage UE and a voltage present across the primary winding N1 which also exhibits an overvoltage peak generated by the stray inductance between the primary and secondary winding. This peak is fed back to the input voltage UE via the first capacitor C1 and the first diode D1 (FIG. 2). When the field-effect transistor T becomes conductive again, the first capacitor C1 is effectively in parallel with the series circuit of the second diode D2 and the first coil L1. The first coil L1 is now charged with the energy stored in the first capacitor C1. This results in a ramp-shaped current rise in the first coil L1 which is ended again when the field-effect transistor T is cut-off. The second coil L2 acts as a demagnetisation coil and has the effect that a part of the energy stored in the first coil L1 is charged into the second capacitor C2 via the third diode D3, as a result of which a negative voltage is built up across the first resistor R1. As a result, the first resistor R1, in series with the second resistor R2, is connected in parallel with the fourth resistor R4. This results in a current flow of a current IK through the series circuit of the first and second resistor R1, R2, as a result of which a voltage is present at the actual-value input I of the pulse-width modulator P, which voltage, compared with the actual-value voltage without the demagnetisation network A, is reduced by the product of the current IK and the sum of the first and second resistors R1, R2. Thus, "too small an output voltage UA" is simulated at the actual-value input I of the pulse-width modulator P. In consequence, the on-time of the field-effect transistor T is extended and the losses in the output voltage UA caused by the winding resistance of the secondary winding N2 and the diode resistance of the sixth diode D6 are compensated again.

In an embodiment not shown in FIG. 1, a direct-voltage source may be connected to the negative pole UE− for the input voltage UE and in series with the parallel circuit of the first resistor R1 and the second capacitor C2. This direct-voltage source is used for compensating for an offset voltage present across the second capacitor C2.

The qualitative voltage and current characteristics of a control voltage UGS between the gate and source electrode of the field-effect transistor T, of a voltage UDS present across the switching path of the field-effect transistor T, of a current IS at the source electrode of the field-effect transistor T, of a current IL1 through the first coil L1 and of a current ID3 flowing through the third diode D3 are shown in FIG. 2. FIG. 2a shows the control voltage UGS present between the gate and the source electrode of the self-blocking N-channel MOS field-effect transistor T. In this figure, the control voltage UGS assumes values which differ from zero in the conducting state of the field-effect transistor T and becomes zero in the cut-off state. The voltage UDS across the switching path of the field-effect transistor T, shown in FIG. 2b, becomes zero in the conducting state of the latter and assumes values which differ from zero in its cut-off state. In this connection, the voltage variation is composed of the sum of the input voltage UE and the flyback voltage across the primary winding N1 of the transformer Tr. Without the presence of the unloading network E, the voltage UDS would also exhibit an overvoltage peak 1 shown dashed in the voltage variation in FIG. 2b. With the presence of the unloading network E, however, this overvoltage peak is fed back via the capacitor C3 through the diode D4 to the positive potential UE+ of the input voltage UE, resulting in a voltage variation UDS without an overvoltage peak 1 for the illustrative embodiment of a direct-voltage flyback converter shown in FIG. 1. In the cut-off state of the field-effect transistor T, there is no current flow and thus no variation of the current IS, shown in FIG. 2c, from the source electrode to the negative potential UE− of the input voltage UE. However, there is a ramp-shaped current rise in the conducting state of the field-effect transistor T, which decreases to zero again upon the cut-off of the field-effect transistor T. Similarly, there is no current flow of the current IL1 shown in FIG. 2d through the first coil L1 in the cut-off state. Similar to the current IS, there is a rise in the current IL1 in the conducting state of the field-effect transistor T, which, however, does not become zero when the field-effect transistor T is first cut off but decreases more slowly due to the energy stored in the core K of the first coil L1 i.e., due to the fact that the energy stored in the coil is discharged to the positive pole UE+ of the input voltage UE via the series circuit formed by the first and second diodes D1 and D2. During this process, a ramp-shaped current variation 2 would occur without the second coil L2. If the switched-mode direct-voltage flyback converter, however, comprises the demagnetisation network A with the second coil L2 in accordance with the illustrative embodiment shown in FIG. 1, this coil L2 acts as a demagnetisation coil which supplies a part of the energy stored in core K to charge the second capacitor C2 via the third diode D3. This results in the current IL1 varying according to the curve 3 shown in FIG. 2d. This results in the current ID3 flowing through the third diode D3 varying as shown in FIG. 2e. In the conducting state of the field-effect transistor T, there is no current flow of the current ID3, whereas in the cut-off state of the field-effect transistor T a current flow occurs which is composed of the superposition of a current resulting from the overvoltage peak 1 represented in FIG. 2b and the current flow 3 of the current IL1 shown in FIG. 2d.

I claim:
1. A direct-voltage flyback converter comprising: a transformer primary winding in series with a switching path of a controllable switch connected to a control device, a first capacitor in series with a first diode being connected in parallel with the primary winding, a series circuit including a first coil, a second diode and the first capacitor being connected in parallel with the switching path, a sensing circuit and a demagnetisation circuit connected to the control device, a further winding of the transformer being connected into the sensing circuit, and a second coil, coupled to the first coil, being connected into the demagnetisation circuit.

2. A direct-voltage flyback converter according to claim 1, wherein the demagnetisation circuit comprises a parallel circuit of a first resistor and of a second capacitor (C2) connected in series circuit with a third diode, means coupling said series circuit in parallel with the second coil, and means connecting a tap of said parallel circuit via a second resistor to an actual-value input of the control device.

3. A direct-voltage flyback converter according to claim 2 wherein the sensing circuit comprises: a fourth diode in series with a third capacitor coupled in parallel with the transformer further winding, means connecting a voltage divider in parallel with the third capacitor, and means connecting a tap of the voltage divider to the actual-value input of the control device.

4. A direct-voltage flyback converter according to claim 2 further comprising a direct voltage source connected in series with the parallel circuit of the first resistor and the second capacitor.

5. A direct-voltage flyback converter according to claim 4 wherein the sensing circuit comprises: a fourth diode in series with a third capacitor coupled in parallel with the transformer further winding, means connecting a voltage divider in parallel with the third capacitor, and means connecting a tap of the voltage divider to the actual-value input of the control device.

6. A direct-voltage flyback converter according to claim 1 wherein the control device comprises a pulse-width modulator.

7. A direct-voltage flyback converter according to claim 1 wherein the sensing circuit further comprises:
a third diode connected in series circuit with a second capacitor,
means connecting said series circuit in parallel with the transformer further winding,
a voltage divider connected in parallel with the second capacitor, and
means coupling a tap on the voltage divider to an actual-value input of the control device.

8. A direct-voltage flyback converter according to claim 1 wherein the transformer further comprises a secondary winding coupled to a pair of output terminals for a load.

9. A direct-voltage flyback converter according to claim 8 wherein said secondary winding and said further winding are each would in a sense opposite to that of the primary winding and said first and second coils are wound in opposite sense to one another.

10. A direct-voltage flyback converter according to claim 1 wherein said control device includes a first input coupled to outputs of the sensing circuit and the demagnetization circuit and a second input coupled to a terminal for a reference voltage.

11. A direct-voltage flyback converter according to claim 10 wherein said transformer primary winding and said switching path of the controllable switch are connected in series across a pair of input terminals for a direct voltage.

12. A direct-voltage flyback converter according to claim 11 wherein said first coil and said first and second diodes are connected in a further series circuit across said pair of input terminals and with said diodes polarized in series aiding configuration.

13. A direct-voltage flyback converter according to claim 1 wherein said transformer primary winding and said switching path of the controllable switch are connected in series across a pair of input terminals for a direct voltage, and wherein said first coil conducts a first current having a linear ramp waveform during a time interval when said switching path is conductive and conducts a second current having a linear ramp waveform opposite to that of the first current and during a part of a time interval during which said switching path is non-conductive.

* * * * *